UNITED STATES PATENT OFFICE.

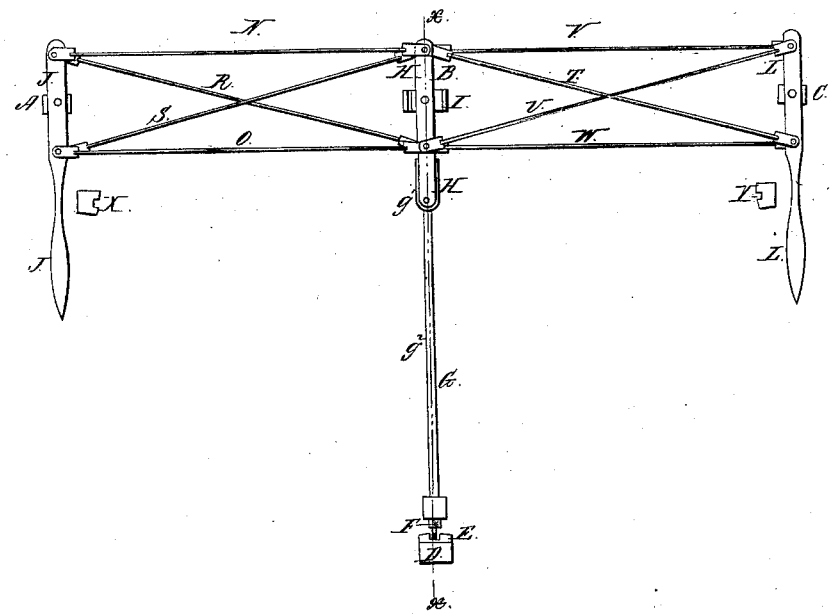
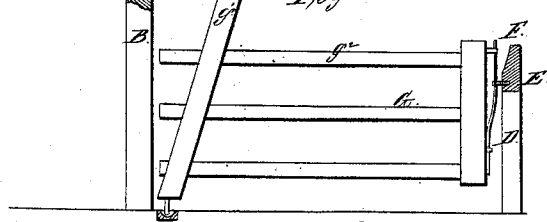
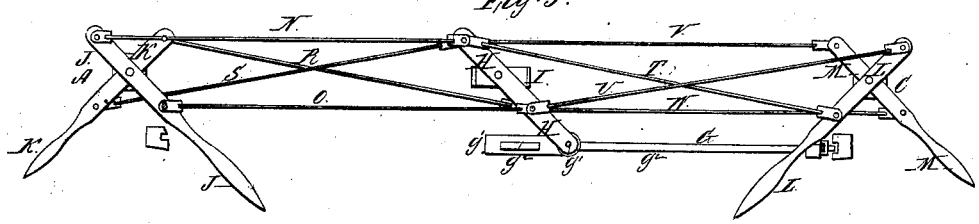

C. P. HAWLEY AND E. B. MURDOCK, OF EAST GALWAY, NEW YORK.

IMPROVEMENT IN GATES.

Specification forming part of Letters Patent No. 56,412, dated July 17, 1866.

*To all whom it may concern:*

Be it known that we, C. P. HAWLEY and E. B. MURDOCK, of East Galway, in the county of Saratoga and State of New York, have invented a new and useful Improvement in Gates; and we do hereby declare that the following is a full, clear, and exact description thereof, which will enable others skilled in the art to make and use the same, reference being had to the accompanying drawings, forming part of this specification, in which—

Figure 1 is a top or plan view of our improved gate when closed. Fig. 2 is a side view of the same when closed, partly in section, through the line $x\,x$, Fig. 1. Fig. 3 is a top or plan view of the same when open.

Similar letters of reference indicate like parts.

Our invention has for its object to furnish an improved gate, which may be opened for passing through, and closed again after passing through, without getting out of the carriage or stopping the team; and it consists in the levers and connecting-rods, in combination with each other, with the supporting-posts, and with the gate, as hereinafter more fully described.

In the construction and arrangement of this gate four posts are employed—three supporting-posts, A, B, and C, and the front post, D, upon which the front or forward end of the gate catches when closed. Upon the side of this post which is toward the gate is placed a catch, E, having a notch in the center of its face, and inclined planes on each side, leading to said notch.

F is a spring or latch attached to the front of the gate, which, when the gate is closed, slides up the inclined planes and springs into the notch of the catch E, holding the gate securely.

The gate G is made in the ordinary form and manner, except that the rear cross-bar, $g'$, is set inclined, as shown in Fig. 2, its upper end inclining toward the front of the gate and extending above the upper horizontal bar, $g^2$, of said gate, as shown. The horizontal bars of the gate extend back beyond the cross-bar $g'$ of the gate, so as to fill up the space which would otherwise be left between the said cross-bar $g'$ and the post B. The lower end of the cross-bar $g'$ is pivoted in a socket placed at the foot of said cross-bar, as shown in Fig. 2, and its upper end is pivoted to the end of the lever H.

The lever H is pivoted to the end of the post B at a point at a distance from the rear end of the said lever equal to one-third of its length, as shown in Figs. 1, 2, and 3.

I is a stop attached to the top of the post B, to prevent the lever H from being turned too far upon said post.

To the top of each of the posts A and C is attached a pair of levers, J K and L M, the upper lever of each pair being a little longer than the lower one, as shown in Fig. 3.

N is a rod, the ends of which are pivoted to the upper sides of the levers J and H at their rear ends. O is a rod pivoted to the upper side of the levers J and H at the same distance in front of the central line of the posts A B C that the rod N is in the rear of it.

R and S are two rods pivoted to the under sides of the levers K and H, as shown in Fig. 3, and which cross each other, the rod R being pivoted to the rear end of the lever K and to the forward part of the lever H, and the rod S being pivoted to the forward part of the lever K and to the rear end of the lever H, as shown.

On the other side of the gate G the levers L and M are connected to the lever H by connecting-rods T U and V W in the same manner as already described with reference to the levers J, K, and H, except that in this case the upper rods cross each other and the lower rods do not.

X and Y are short posts, to the tops of which are attached catches which, when the gate is opened, catch upon the latch F and hold the gate open until the levers are again operated.

In approaching the gate from left to right in Fig. 1, the driver, without stopping the team, takes hold of the projecting end of the lever J, and moves it into the position shown in Fig. 3. After passing through the gateway, by taking hold of the lever L, which now stands in the position shown in Fig. 3, and moving it into the position shown in Fig. 1, the gate will be closed in the rear of the advancing carriage. In approaching the gate from right to left the operation is the same, except that the lower levers, M and K, are operated in this case, the gate in each case opening from the advancing team, and the driver in all cases moving the levers in the direction in which he is advancing.

What we claim as new, and desire to secure by Letters Patent, is—

The levers J K H L M, and connecting-rods N O R S and T U V W, constructed and arranged, as herein described, in combination with each other, with the supporting-posts A B C, and with the gate G, substantially as herein described, and for the purposes set forth.

The above specification of our invention signed by us this 20th day of April, 1866.

C. P. HAWLEY.
E. B. MURDOCK.

Witnesses:
S. A. AUSTIN,
A. ENOS.